(12) United States Patent
Hong et al.

(10) Patent No.: US 11,125,939 B1
(45) Date of Patent: Sep. 21, 2021

(54) WAVEGUIDE FILTERING BIOCHEMICAL SENSOR

(71) Applicant: GeneSense Technology Inc., Shanghai (CN)

(72) Inventors: Bingzhou Hong, Shanghai (CN); Xianchao Wang, Shanghai (CN); Haochen Cui, Shanghai (CN); Tianshu Wang, Shanghai (CN); Yinghua Sun, Shanghai (CN); Mei Yan, Shanghai (CN)

(73) Assignee: GeneSense Technology Inc., Shanghai (CN)

( * ) Notice: Subject to any disclaimer, the term of this patent is extended or adjusted under 35 U.S.C. 154(b) by 0 days.

(21) Appl. No.: 17/224,105

(22) Filed: Apr. 6, 2021

(30) Foreign Application Priority Data

Dec. 1, 2020 (CN) .......................... 202011382461.1

(51) Int. Cl.
   *G01J 3/14* (2006.01)
   *G02B 6/10* (2006.01)
   *G01J 3/12* (2006.01)

(52) U.S. Cl.
   CPC .................. *G02B 6/10* (2013.01); *G01J 3/14* (2013.01); *G01J 2003/1226* (2013.01)

(58) Field of Classification Search
   CPC ....... G02B 6/10; G01J 3/14; G01J 3/12; G01J 2003/1226; H01L 31/0232
   See application file for complete search history.

(56) References Cited

U.S. PATENT DOCUMENTS

| 8,906,320 | B1 | 12/2014 | Eltoukhy et al. |
| 9,658,161 | B2 | 5/2017 | Saxena et al. |
| 2015/0057194 | A1* | 2/2015 | McCaffrey ......... G01N 21/6428 506/39 |

* cited by examiner

*Primary Examiner* — Abdullahi Nur
(74) *Attorney, Agent, or Firm* — Mauriel Kapouytian Woods LLP; Liang Huang

(57) ABSTRACT

A waveguide filter sensing unit is provided. The waveguide sensing unit includes an input waveguide for receiving an optical signal and an interference waveguide region for filtering the optical signal to remove noise therein. The waveguide sensing unit further includes a cladding layer wrapping around the input waveguide and the interference waveguide region; and an optical signal detector converting the filtered optical signal into an electrical signal. The width of the input waveguide is smaller than that of the interference waveguide region, and the refractive index of the cladding layer is smaller than that of the input waveguide and the interference waveguide region.

23 Claims, 3 Drawing Sheets

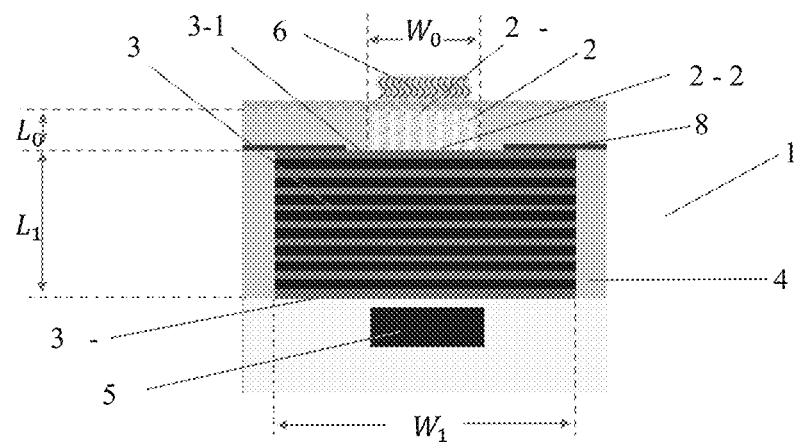
FIG. 2a
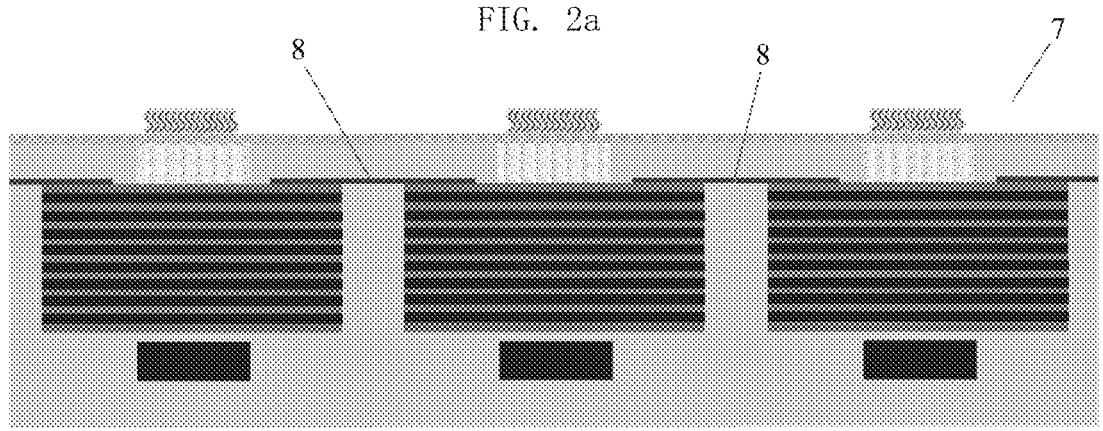
FIG. 2b
FIG. 3
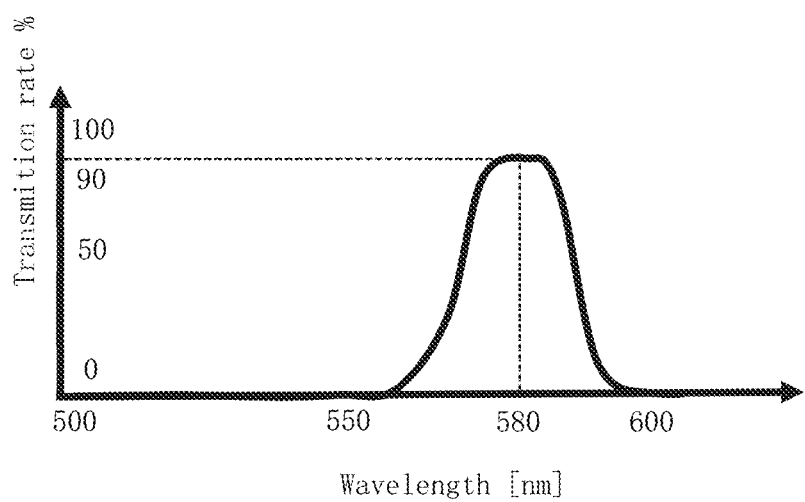

WAVEGUIDE FILTERING BIOCHEMICAL SENSOR

CROSS REFERENCE TO RELATED APPLICATIONS

This application claims the benefit of priority to Chinese Application No. 202011382461.1, filed Dec. 1, 2020. The entire contents of this application is incorporated herein by reference for all purposes.

TECHNICAL FIELD

The present application relates to a biochemical detection device, and more particularly, to a waveguide filter biochemical sensor.

BACKGROUND OF THE INVENTION

In the field of in-vitro diagnostics (IVD), real-time detection using bioluminescence signals is a common technical means. Current mainstream detection techniques, such as immunodetection techniques, molecular (nucleic acid) detection techniques (e.g., PCR), and gene sequencing techniques, all require real-time quantitative detection, reading, and analysis via bioluminescence signals.

In order to improve the integration of the detection apparatus, a lab-on-a-chip is implemented in the prior art by minimizing and incorporating the basic functions of laboratories, such as fluid laboratory, biological laboratory, chemical laboratory and the like, into a chip (such as a CMOS image sensor chip) with a size of a few square centimeters or even a few square millimeters. In such an apparatus, a sample of a biological or chemical substance is conveyed and fixed to the surface of an image sensor chip, a fluorescent signal emitted by the sample is received and detected by the image sensor, and relevant information of the sample of the biological or chemical substance can be judged of the intensity and color of the detected optical signal.

Typical optical detection processes based on CMOS image sensors are generally as follows: 1. A certain excitation condition is given to the sample to be measured, for example, the sample is illuminated with excitation light; 2. The sample absorbs excitation light energy to generate radiation fluorescence, that is, an optical signal to be measured; 3. The excitation light, together with the optical signal to be measured, passes through an optical focusing and filtering structure (used to filter the excitation light), and reaches a light-receiving element of a CMOS sensor, such as a photodiode; 4. The CMOS sensor converts the optical signal into an electrical signal, and finally processes the electrical signal into an image output, thereby detecting the relevant information of the sample.

In the image sensing apparatus described above, the signal arriving at the light receiving element includes a useful signal portion carrying the sample information to be measured, and a noise signal portion. The noise signal portion has an adverse effect on the final imaging. If the final imaging quality is to be improved, it is necessary to improve the Signal-to-Noise Ratio (SNR) as much as possible. In terms of technical means, there are generally two paths: 1. Reducing the noise intensity; 2. Increase the signal strength.

The part of the noise signal in the optical signal to be measured mainly comes from the excitation light and the crosstalk signals from adjacent samples. In the prior art, the excitation light noise is generally filtered by providing a filter layer, and the signal cross-talk between adjacent samples is reduced or avoided by providing a barrier layer and/or a focusing structure.

The radiation intensity of the optical signal to be measured is generally determined by the excitation environment. Therefore, when the excitation environment is not adjusted, the collection efficiency of the signal light must be improved to avoid attenuation of the useful signal intensity including the sample information in the optical signal to be measured, and thereby increase the intensity of the useful signal portion received by the light receiving element of the image sensor.

In the prior art, a micro lens, an annular grating, a Fresnel zone plate, and the like are used as a focusing structure. These focusing structures regulate the far-field distribution of the signal light by regulating the phase of the signal light, thereby focusing the sample signal onto the surface of the corresponding light-receiving element, reducing signal attenuation, and avoiding signal crosstalk between adjacent samples. However, these structures are problematic in that, first, they are complex in structure, stringent in terms of design and process tolerances, and need a long time for product optimization. Second, the structure sizes are relatively large. Some structure sizes can be made as small as 5~10 μm in length or width at present, but cannot be smaller, and cannot be applied to a smaller light-receiving element such as a photodiode having a length or width of 1 um or less. Moreover, the collection efficiency of the signal light cannot be improved, because only the light received by these structures can be regulated while other optical signals are wasted, thereby reducing the intensity of the useful signal received by the sensor light-receiving element, and affecting the detection result.

SUMMARY OF THE INVENTION

In order to solve the above problems in the prior art, the present invention provides a waveguide filter sensing unit comprising an input waveguide for introducing an optical signal to be measured, which has a length $L_0$, a width $W_0$, and a refractive index $n_0$, wherein the optical signal to be measured has a center wavelength $\lambda$ and is inputted from an upper surface of the input waveguide and outputted from a lower surface thereof; a interference waveguide region for filtering the optical signal to be measured to remove noise therein, which has a length $L_1$, a width $W_1$, and a refractive index $n_1$, the optical signal to be measured being inputted from an upper surface of the interference waveguide region and outputted from a lower surface of the interference waveguide region; a cladding layer having an refractive index $n_2$, wrapping around the input waveguide and the interference waveguide region; an optical signal detecting unit disposed below the lower surface of the interference waveguide region for receiving a filtered optical signal output from the lower surface of the interference waveguide region and converting the filtered optical signal into an electrical signal; the width $W_0$ of the input waveguide is smaller than the width $W_1$ of the interference waveguide region, and the refractive index $n_2$ of the cladding layer is smaller than the refractive index $n_0$ of the input waveguide and the refractive index $n_1$ of the interference waveguide region.

The present invention further provides a waveguide filter biochemical sensor comprising an array of waveguide filter sensing units, each waveguide filter sensing unit in the array comprising an input waveguide for introducing an optical signal to be measured, which has a length $L_0$, a width $W_0$, and a refractive index $n_0$, wherein the optical signal to be measured has a center wavelength λ and is inputted from an upper surface of the input waveguide and outputted from a lower surface thereof; a interference waveguide region for filtering the optical signal to be measured to remove noise therein, which has a length $L_1$, a width $W_1$, and a refractive index $n_1$, the optical signal to be measured being inputted from an upper surface of the interference waveguide region and outputted from a lower surface of the interference waveguide region; a cladding layer having an refractive index $n_2$, surrounding the input waveguide and the interference waveguide region; an optical signal detecting unit disposed below the lower surface of the interference waveguide region for receiving a filtered optical signal output from the lower surface of the interference waveguide region and converting the filtered optical signal into an electrical signal; the width $W_0$ of the input waveguide is smaller than the width $W_1$ of the interference waveguide region, and the refractive index $n_2$ of the cladding layer is smaller than the refractive index $n_0$ of the input waveguide and the refractive index $n_1$ of the interference waveguide region.

In a preferred embodiment of the present invention, the optical signal detecting unit comprises a photodiode in a CMOS sensor pixel, the surface thereof for receiving the optical signal being opposite to the lower surface of the input waveguide, and the two surfaces being of approximately same dimensions and shape.

As a preferred embodiment of the present invention, the difference between the refractive index $n_0$ of the input waveguide and the refractive index $n_1$ of the interference waveguide region is not more than 0.01, and the difference between the refractive index $n_2$ of the cladding layer and the refractive index $n_1$ of the interference waveguide region is not less than 0.02.

As a preferred embodiment of the present invention, the length $L_1$ of the interference waveguide region satisfies the following formula:

$$L = N \times \frac{2n_1\left(W_1 + \frac{\lambda}{\pi}\left(\frac{n_2}{n_1}\right)(n_1^2 - n_2^2)^{-\frac{1}{2}}\right)^2}{\lambda}$$

$$N \times L - \frac{20}{N}\% \times L \leq L_1 \leq N \times L + \frac{20}{N}\% \times L$$

Wherein, $n_1$ is the refractive index of the interference waveguide region, $n_2$ is the refractive index of the cladding layer, λ is the center wavelength of the optical signal to be measured, $W_1$ is the width of the interference waveguide region, and N is a positive integer.

In a preferred embodiment of the invention, the upper surface of the input waveguide is provided with a sample carrying region adapted to collect and carry the sample material to be detected.

A preferred embodiment of the waveguide filter biochemical sensor of the present invention further comprises a metal grid disposed between adjacent waveguide filter sensing units for preventing signal crosstalk between adjacent waveguide filter sensing units and blocking noise optical signals.

The waveguide filter sensing unit of the present invention can effectively collect the optical signal to be measured while filtering out the excitation optical noise and the crosstalk noise in the optical signal, and avoids the intensity attenuation of the useful part of the optical signal. Under the same excitation light condition, compared with the prior art sensor device, the waveguide filter sensor of the present invention can greatly reduce loss of signal strength in the signal transmission process and avoid signal crosstalk between adjacent samples, thereby achieving better quality imaging and more accurate detection results.

At the same time, the waveguide filter sensing unit of the present invention is simple in structure and can be made smaller, so that the waveguide filter sensing unit can be applied to a CMOS image sensor chip in which the pixel size is getting smaller and the component integration is getting greater, thereby producing a biochemical sensing device having a larger detection throughput.

BRIEF DESCRIPTION OF THE DRAWINGS

FIG. 1b is a schematic partial cross-sectional view of an embodiment of the waveguide filter biochemical sensor of the present invention employing the waveguide filter sensing unit shown in FIG. 1a.

FIG. 2a is a schematic cross-sectional view of an embodiment of the waveguide filter sensing unit of the present invention, and FIG. 2b is a schematic partial cross-sectional view of an embodiment of the waveguide filter biochemical sensor of the present invention employing the waveguide filter sensing unit shown in FIG. 2a.

FIG. 3 is a schematic diagram illustrating the filtering effect of one embodiment of the waveguide filter sensor of the present invention.

DETAILED DESCRIPTION OF THE INVENTION

Embodiments of the present invention will be described with reference to the accompanying drawings.

Exemplary embodiments will be described in detail herein, examples of which are illustrated in the accompanying drawings. When the following description refers to the drawings, the same numbers in different drawings indicate the same or similar elements unless otherwise indicated. The embodiments described in the following exemplary embodiments do not represent all embodiments consistent with the present invention. Rather, they are merely examples of devices and methods consistent with some aspects of the invention as detailed in the appended claims.

The terminology used in this application is for the purpose of describing particular embodiments only and is not intended to limit the invention. As used herein and in the appended claims, the singular forms "a," "the," and "the" are also intended to include the plural forms unless the context clearly indicates otherwise. "comprising" or "including" and the like are intended to mean that elements or articles before "comprising" or "including" cover the elements or items listed after "comprising" or "including" and their equivalents, and do not exclude other elements or objects.

Figure 1A:
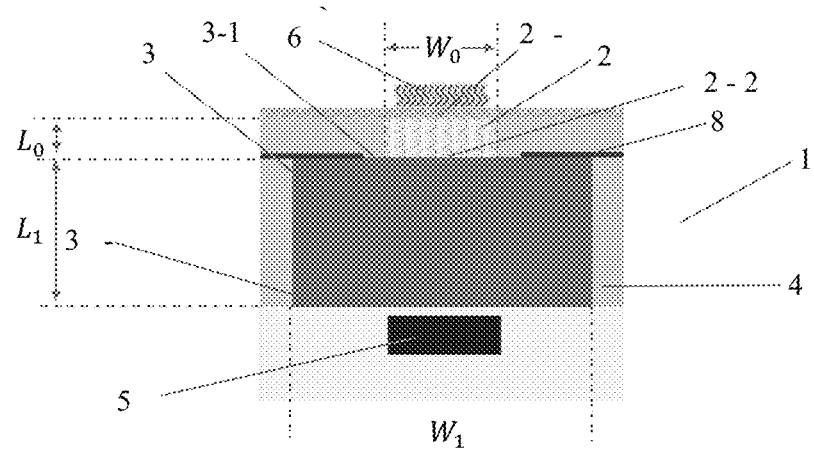
FIG. 1a is a schematic cross-sectional view of an embodiment of the waveguide filter sensing unit of the present invention.

FIG. 1A schematically shows a waveguide filter sensing unit 1 according to an embodiment of the invention. As shown in the drawing, the waveguide filter sensing unit 1 of the present invention includes an input waveguide 2, a interference waveguide region 3, an cladding layer 4, and an optical signal detecting unit 5. It should be noted that, although not shown in the drawing, the cross-section of the input waveguide 2 and the interference waveguide region 3 is rectangular or other suitable shape. The upper surface 2-1 of the input waveguide 2 is provided with a carrying region 6 for the sample to be measured, which is adapted to collect and carry the liquid sample material. The lower surface 2-2 of the input waveguide 2 is in contact with the upper surface 3-1 of the interference waveguide region 3. The optical signal detecting unit 5 is disposed below the lower surface 3-2 of the interference waveguide region 3 and is opposite to the lower surface 2-2 of the input waveguide 2. In a preferred embodiment, the surface shape and the size of the surface of the detecting unit 5 receiving incident optical signal and the lower surface 2-2 are preferably same or approximately same, thereby to collect all the optical signals emitting from the surface 2-2. The optical signal detecting unit 5 may be a photodiode in a CMOS image sensor pixel for converting the received optical signal into an electrical signal which is output as a pixel signal after being processed by the CMOS image sensor pixel. The surface on which the photodiode receives the optical signal to be measured is opposite to the lower surface 2-2 of the input waveguide, and has same or approximately same dimensions and shape. The cladding layer 4 is cladding around the peripheral sides of the input waveguide 2 and the interference waveguide region 3 except for its lower and upper surfaces.

The input waveguide 2 and the interference waveguide region 3 are made of a material having a high refractive index, but the refractive index difference thereof should not be greater than 0.01. The input waveguide 2 may be made of, for example, silicon nitride, silicon oxynitride, or silicon dioxide doped with phosphorus and boron. In the embodiment shown in FIG. 1*a*, the interference waveguide region 3 is made of a bulk material having absorption characteristics for excitation light and facilitating transmission of a sample fluorescence signal, for example, an organic compound doped with nonferrous metal ions, a red resin, a green resin, a blue resin, or the like.

The cladding layer 4 is made of a material having a low refractive index, for example, silicon dioxide, and the difference between the refractive index of the cladding layer 4 and the refractive index of the interference waveguide region 3 should not be less than 0.02.

The width $W_1$ of the interference waveguide region 3 is larger than the width $W_0$ of the input waveguide 2, and the lower surface 3-2 thereof covers the optical signal detection unit 5 completely.

In a preferred embodiment, the length $L_1$ of the interference waveguide region 3 satisfies the following formula:

$$L = N \times \frac{2n_1 \left( W_1 + \frac{\lambda}{\pi} \left( \frac{n_2}{n_1} \right) (n_1^2 - n_2^2)^{-\frac{1}{2}} \right)^2}{\lambda}$$

$$N \times L - \frac{20}{N}\% \times L \leq L_1 \leq N \times L + \frac{20}{N}\% \times L$$

Wherein, $n_1$ is the refractive index of the interference waveguide region, $n_2$ is the refractive index of the cladding layer, $\lambda$ is the center wavelength of the optical signal to be measured, $W_1$ is the width of the interference waveguide region, and N is a positive integer.

The interference waveguide region whose length satisfies the above formula can efficiently transmit the signal light field from the upper surface to the lower surface thereof, and the signal light field is received by the photodiode provided below.

In addition, as a preferred embodiment, the length $L_0$ of the input waveguide 2 should be set to be not less than the center wavelength $\lambda$ of the optical signal to be measured.

The operation procedure of the above-described embodiment is as follows: The sample 6 to be measured in the sample carrying region is excited by excitation light to generate a fluorescent signal, which is incident on the input waveguide 2, and then passes through the interference waveguide region 3, wherein a majority of the excitation light noise signal contained therein is absorbed by the bulk material of the interference waveguide region 3, and a majority of the useful signal carrying the information of the sample can pass through and reach the optical signal detecting unit 5 to be received and converted into an electrical signal, which is then converted into a pixel signal output by a sensor pixel (e.g., a CMOS sensor pixel).

Figure 1B:
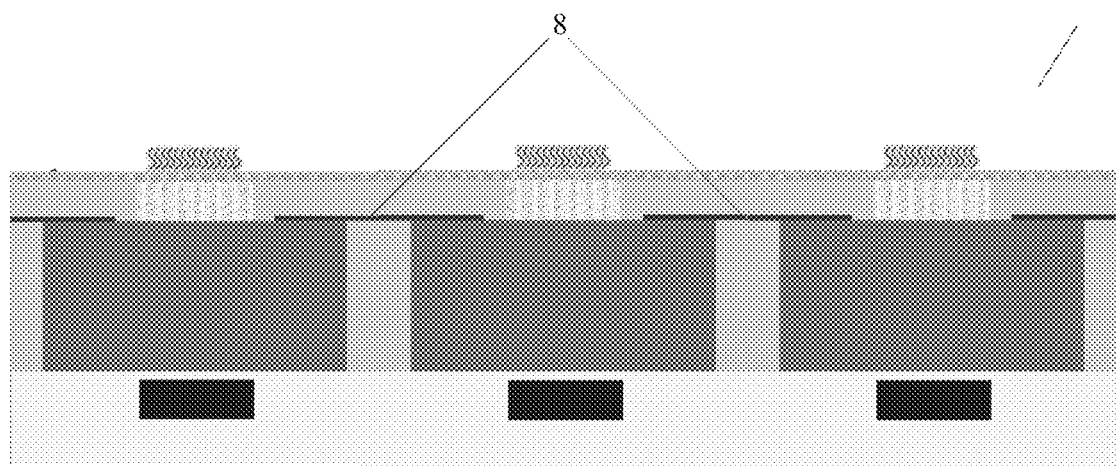

FIG. 1*b* schematically shows a partial cross-section of a waveguide filter biochemical sensor 7 according to an embodiment of the present invention, comprising an array of waveguide filter sensing units 1 shown in FIG. 1*a*. As can be seen, in the junction of adjacent waveguide filter sensing units, a metal gate 8 is provided for blocking the light of the sample signal from entering the adjacent sensing unit, and for blocking noise light signals such as excitation light and FIG. 2*a* schematically shows a cross-section of a waveguide filter sensing unit 1 according to another embodiment of the invention. This embodiment differs from the embodiment shown in FIG. 1*a* only in that the interference waveguide region 3 therein consists of a plurality of laminate combination including layers having different refractive indices, for example, a plurality of SiO2/TiO2, ZrO2/SiO2 or GaP/TiO2 laminated layers. Such a laminate structure can be designed to remove the noise signal in the optical signal by reflection and to let pass the useful signal carrying the sample information therein. In a preferred embodiment of the present invention, the laminate structure comprises a plurality of laminate combination, each laminate combination comprising, for example, a layer of SiO2 and a layer of TiO2 having different refractive indices. In this case, the equivalent refractive index $n_1$ is used as the refractive index of the interference waveguide region 3, and the above-mentioned formula for the length of the interference waveguide region 3 is still applicable. Similarly, the interference waveguide region of the laminate structure in which the length satisfies the above formula can transmit entirely the signal light field from the upper surface to the lower surface thereof, and the signal light field is received by the photodiode provided below.

FIG. 2*b* schematically shows a partial cross-section of a waveguide filter biochemical sensor 7 according to another embodiment of the invention, comprising an array of waveguide filter sensor units 1 as shown in FIG. 2*a*. It can also be seen that, in the junction of adjacent waveguide filter sensing units 1, a metal gate 8 is provided for blocking the signal light from adjacent sensing unit and for blocking noise signal light such as excitation light and background light.

In the above-described embodiments of the present invention, the near-end optical field of the optical signal emitted by the sample 6 is transmitted to the lower surface of the interference waveguide region 3 and outputted as a far-end optical field. The intensity attenuation of the signal light is small except that the phase of the signal light is changed, and the transmission rate can reach 80% or more, that is, more than 80% of the signal light power is transmitted through the entire structure.

FIG. 3 schematically shows the filtering effect of one embodiment of the waveguide filter sensing unit of the present invention. In this embodiment, the input waveguide 2 is made of silicon dioxide material (refractive index 1.50) having a width of 1 μm and a length of 1.8 μm. The interference waveguide region 3 is made of SiO2/TiO2 laminate combination having an equivalent refractive index of 1.50, a width of 3 μm and a length of 4.8 μm. The cladding layer 4 is made of silicon dioxide (refractive index 1.48) material. It can be seen that the transmission rate reaches 90% for the optical signal having a center wavelength of 580 nm, and is close to zero for the noise signal having a wavelength of 535 nm included in the optical signal.

Figure 4:
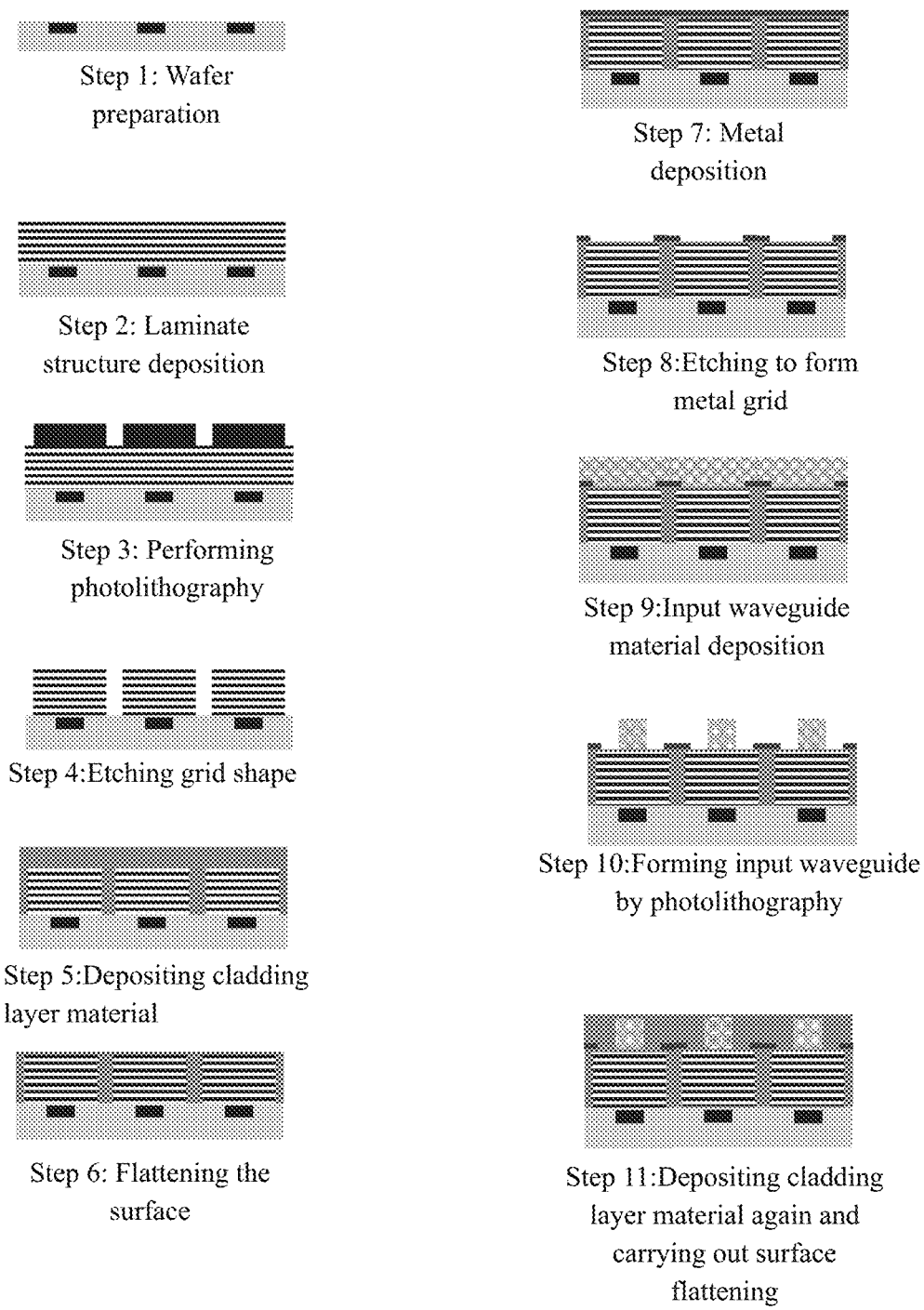
FIG. 4 is a schematic flow diagram of one embodiment of the method for fabricating the waveguide filter biochemical sensor of the present invention as shown in FIG. 2b.

FIG. 4 schematically shows a method of manufacturing the waveguide filter biochemical sensor of the present invention based on the embodiment shown in FIG. 2b of the present invention.

Step 1: Preparing an image sensor wafer, such as an 8 inch or 12 inch CMOS image sensor chip wafer. Each chip includes an array of CMOS pixels and each CMOS pixel includes a photodiode.

Step two: Depositing a laminate structure on the surface of the wafer where the photodiode receives the optical signal. Each laminate includes a layer of material having a higher refractive index and a layer of material having a lower refractive index. In general, the refractive index difference between the two laminate materials should be not less than 0.01. For example, a material having a higher refractive index may be selected from one of titanium oxide, hafnium oxide, tantalum oxide, zirconium oxide, gallium phosphide, and germanium, and a material having a lower refractive index may be one of SiO2, Teflon, and various metal oxides such as oxides of aluminum, zirconium, and titanium.

Step 3: Applying a photoresist to the surface of the laminate structure, and performing photolithography to form a desired pattern.

Step 4: The laminate structure is etched to form a desired grid of trenches, and the etching depth should reach the wafer surface.

Step 5: Depositing the cladding layer material so as to fill the etched trenches. The deposition method may employ physical vapor deposition, chemical vapor deposition, or the like. In one embodiment, the deposited cladding layer material may be, for example, silicon dioxide.

Step 6: Flattening the surface of wafer using chemical mechanical polishing.

Step 7: Depositing a metal layer. The metal material may be aluminum, tungsten, titanium, tantalum, copper, chromium, nickel, cobalt, or the like. Generally, a physical vapor deposition method or an electroplating method is used.

Step 8: The metal layer is etched by a photolithography process, for example, by dry etching, and the metal layer is etched down to the surface of the laminate structure, so that the metal layer is shaped into a metal grid, thereby forming the metal gate 8 between adjacent detecting units as shown in FIGS. 1b and 2b.

Step 9: Depositing the input waveguide material. In addition to the necessary light-transmitting properties, the material should be insulating and have a refractive index almost same with the equivalent refractive index of the laminate structure formed in Step 2, and the difference should not be greater than 0.01. For example, silicon nitride, silicon oxynitride, silicon dioxide doped with phosphorus and boron, and the like may be used.

Step 10: Photolithography is performed to form a desired input waveguide shape. It should be noted that the etching of the input waveguide material should be stopped at the surface of the underlying laminate structure and the surface of the metal gate, while exposing the metal grid formed in Step 8. In a preferred embodiment, the surface (i.e., the lower end surface) of each input waveguide in contact with the laminate structure should correspond to a photodiode of a CMOS pixel, and the lower surface of each input waveguide is of same or approximately same dimensions and shape as the surface of the corresponding photodiode receiving signal light, i.e., the dimensions and shape of the corresponding surfaces of the two components are identical or approximately same.

Step 11: The cladding layer material, such as silicon dioxide, is deposited again and the surface is then flattened using chemical mechanical polishing.

In a preferred embodiment, the flattened surface is further treated such that a hydrophilic region is formed in the upper surface of the input waveguide formed in Steps 9 and 10, as a sample carrying region which can collect and carry liquid biochemical samples, while the other regions are hydrophobic, repelling the liquid sample material.

For the waveguide filter biochemical sensor 7 of the embodiment shown in FIG. 2b, the manufacturing steps are basically the same as those described above, except that the corresponding bulk material, such as red resin, is deposited in Step 2 instead of the laminate structure.

While the present invention has been illustrated and described with reference to certain preferred embodiments, it will be understood by those skilled in the art that various changes may be made in varied form and detail without departing from the spirit and scope of the invention.

The invention claimed is:

1. A waveguide filter sensing unit comprising:
   an input waveguide for receiving an optical signal to be measured, wherein the input waveguide has a length $L_0$, a width $W_0$, and a refractive index $n_0$, wherein the optical signal to be measured has a center wavelength λ and is inputted from an upper surface of the input waveguide and outputted from a lower surface of the input waveguide;
   an interference waveguide region for filtering the optical signal to remove noise therein, wherein the interference waveguide has a length $L_1$, a width $W_1$, and a refractive index $n_1$, the optical signal being inputted from an upper surface of the interference waveguide region and outputted from a lower surface of the interference waveguide region;
   a cladding layer having a refractive index $n_2$, the cladding layer wrapping around the input waveguide and the interference waveguide region; and
   an optical signal detector disposed below the lower surface of the interference waveguide region for receiving the optical signal filtered and outputted from the lower surface of the interference waveguide region, the optical signal detector converting the filtered optical signal into an electrical signal,
   wherein the width $W_0$ of the input waveguide is smaller than the width $W_1$ of the interference waveguide region, and the refractive index $n_2$ of the cladding layer is smaller than the refractive index $n_0$ of the input waveguide and the refractive index $n_1$ of the interference waveguide region.

2. The waveguide filter sensing unit of claim 1, wherein the optical signal detector comprises a photodiode in a CMOS sensor pixel, the surface thereof for receiving the optical signal being opposite to the lower surface of the input waveguide, and the two surfaces being of approximately same dimensions and shape.

3. The waveguide filter sensing unit of claim 1, wherein a difference between the refractive index $n_0$ of the input waveguide and the refractive index $n_1$ of the interference waveguide region is not more than 0.01, and a difference between the refractive index $n_2$ of the cladding layer and the refractive index $n_1$ of the interference waveguide region is not less than 0.02.

4. The waveguide filter sensing unit of claim 1, wherein the interference waveguide region comprises a bulk material having a single refractive index.

5. The waveguide filter sensing unit of claim 4, wherein the length $L_1$ of the interference waveguide region satisfies the following formula:

$$L = \frac{2n_1\left(W_1 + \frac{\lambda}{\pi}\left(\frac{n_2}{n_1}\right)(n_1^2 - n_2^2)^{-\frac{1}{2}}\right)^2}{\lambda}$$

$$N \times L - \frac{20}{N}\% \times L \leq L_1 \leq N \times L + \frac{20}{N}\% \times L$$

wherein N is a positive integer.

6. The waveguide filter sensing unit of claim 4, wherein the bulk material comprises at least one of a red resin, a green resin, a blue resin, or an organic compound doped with nonferrous metal ions.

7. The waveguide filter sensing unit of claim 1, wherein the interference waveguide region comprises a plurality of laminated combinations including layers having different refractive indices, the refractive index $n_1$ of the interference waveguide region is an equivalent refractive index.

8. The waveguide filter sensing unit of claim 7, wherein at least one of the plurality of laminate combinations comprises at least one of $SiO2/TiO2$, $ZrO2/SiO2$, or $GaP/TiO2$ laminated layers.

9. The waveguide filter sensing unit of claim 1, wherein the cladding layer comprises a silicon dioxide material.

10. The waveguide filter sensing unit of claim 1, wherein the upper surface of the input waveguide is provided with a sample carrying region adapted to collect and carry a sample for detection.

11. The waveguide filter sensing unit of claim 1, wherein the length $L_0$ of the input waveguide is not less than the center wavelength $\lambda$ of the optical signal to be measured.

12. A waveguide filter biochemical sensor comprising an array of waveguide filter sensing units, each waveguide filter sensing unit in the array comprising:

an input waveguide for receiving an optical signal to be measured, wherein the input waveguide has a length $L_0$, a width $W_0$, and a refractive index $n_0$, wherein the optical signal to be measured has a center wavelength $\lambda$ and is inputted from an upper surface of the input waveguide and outputted from a lower surface of the input waveguide;

an interference waveguide region for filtering the optical signal to remove noise therein, wherein the interference waveguide has a length $L_1$, a width $W_1$, and a refractive index $n_1$, the optical signal being inputted from an upper surface of the interference waveguide region and outputted from a lower surface of the interference waveguide region;

a cladding layer having a refractive index $n_2$, the cladding layer wrapping around the input waveguide and the interference waveguide region; and an optical signal detector disposed below the lower surface of the interference waveguide region for receiving the optical signal filtered and outputted from the lower surface of the interference waveguide region, the optical signal detector converting the filtered optical signal into an electrical signal, wherein the width $W_0$ of the input waveguide is smaller than the width $W_1$ of the interference waveguide region, and the refractive index $n_2$ of the cladding layer is smaller than the refractive index $n_0$ of the input waveguide and the refractive index $n_1$ of the interference waveguide region.

13. The waveguide filter biochemical sensor of claim 12, wherein the optical signal detector includes a photodiode in a CMOS sensor pixel, the surface thereof for receiving the optical signal being opposite to the lower surface of the input waveguide, and the two surfaces being of approximately same dimensions and shape.

14. The waveguide filter biochemical sensor of claim 12, wherein a difference between the refractive index $n_0$ of the input waveguide and the refractive index $n_1$ of the interference waveguide region is not more than 0.01, and a difference between the refractive index $n_2$ of the cladding layer and the refractive index $n_1$ of the interference waveguide region is not less than 0.02.

15. The waveguide filter biochemical sensor of claim 12, wherein the interference waveguide region comprises a bulk material having a single refractive index.

16. The waveguide filter biochemical sensor of claim 15, wherein the bulk material comprises at least one of a red resin, a green resin, a blue resin, or an organic compound doped with nonferrous metal ions.

17. The waveguide filter biochemical sensor of claim 12, wherein the interference waveguide region comprises a plurality of laminated combinations including layers having different refractive indices, the refractive index $n_1$ of the interference waveguide region is an equivalent refractive index.

18. The waveguide filter biochemical sensor of claim 15, wherein the length $L_1$ of the interference waveguide region satisfies the following formula:

$$L = N \times \frac{2n_1\left(W_1 + \frac{\lambda}{\pi}\left(\frac{n_2}{n_1}\right)(n_1^2 - n_2^2)^{-\frac{1}{2}}\right)^2}{\lambda}$$

$$N \times L - \frac{20}{N}\% \times L \leq L_1 \leq N \times L + \frac{20}{N}\% \times L$$

where N is a positive integer.

19. The waveguide filter biochemical sensor of claim 17, wherein at least one of the plurality of laminate combinations comprises at least one of a $SiO2/TiO2$, $ZrO2/SiO2$, or $GaP/TiO2$ laminate layers.

20. The waveguide filter biochemical sensor of claim 12, wherein the cladding layer comprises a silicon dioxide material.

21. The waveguide filter biochemical sensor of claim 12, wherein the upper surface of the input waveguide is provided with a sample carrying region adapted to collect and carry a sample for detection.

22. The waveguide filter sensing unit of claim 12, wherein the length $L_0$ of the input waveguide is not less than the center wavelength $\lambda$ of the optical signal to be measured.

23. The waveguide filter biochemical sensor of claim 12, further comprising a metal grid disposed between adjacent waveguide filter sensing units for preventing signal crosstalk between the adjacent waveguide filter sensing units and blocking noise optical signals.

* * * * *